United States Patent
Nishiue et al.

(10) Patent No.: US 7,060,913 B2
(45) Date of Patent: Jun. 13, 2006

(54) MEASURING APPARATUS

(75) Inventors: Kaname Nishiue, Ritto (JP); Tsutomu Okamoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 198 days.

(21) Appl. No.: 10/790,228

(22) Filed: Mar. 2, 2004

(65) Prior Publication Data

US 2004/0173388 A1    Sep. 9, 2004

(30) Foreign Application Priority Data

Mar. 5, 2003 (JP) ............................. 2003-058085

(51) Int. Cl.
G01G 19/00    (2006.01)
G01G 11/00    (2006.01)

(52) U.S. Cl. .................................... 177/145

(58) Field of Classification Search ............... 177/119, 177/145
See application file for complete search history.

(56) References Cited

U.S. PATENT DOCUMENTS

| | | | |
|---|---|---|---|
| 3,180,475 A * | 4/1965 | Del Rosso | 177/145 |
| 4,566,584 A * | 1/1986 | Lindstrom | 177/145 |
| 5,220,969 A * | 6/1993 | DeBarber et al. | 177/145 |
| 5,256,835 A * | 10/1993 | Rydzak | 177/145 |
| 5,326,938 A * | 7/1994 | Tolson | 177/5 |
| 5,434,366 A * | 7/1995 | Troisi | 177/52 |
| 6,084,184 A * | 7/2000 | Troisi | 177/145 |

FOREIGN PATENT DOCUMENTS

| | | |
|---|---|---|
| JP | 8-18011 B2 | 10/1991 |
| JP | 3168494 B2 | 1/1995 |

* cited by examiner

*Primary Examiner*—Randy W. Gibson
(74) *Attorney, Agent, or Firm*—Shinlyu Global IP Counselors

(57) ABSTRACT

A measuring apparatus includes a measuring conveyor measuring a weight of an article during transportation, a feed conveyor, a discharge conveyor, and a central conveyor extending in a transporting direction through the measuring conveyor. In a first transfer area where the article is transferred from the feed conveyor to the measuring conveyor and in a second transfer area where the article is transferred from the measuring conveyor to the discharge conveyor, level portions of a transporting surface of the central conveyor are located at the same level as that of the measuring conveyor. In a measuring area where the measuring conveyor is located, the lower portion of the transporting surface of the central conveyor is shifted downward from that of the measuring conveyor. The measuring apparatus can stably transport the article, suppress vibrations during transfer to and from a measuring conveyor, and improve the measuring accuracy.

9 Claims, 6 Drawing Sheets

(a)

(b)

(c)

MEASURING APPARATUS

BACKGROUND OF THE INVENTION

1. Field of the Invention

The present invention generally relates to a measuring apparatus. More specifically, the present invention relates to a measuring apparatus for measuring a weight of an article while transporting the article.

2. Background Information

In production lines of processed foods or the like, it is generally necessary to measure weights of articles for inspection or classification of the articles. As apparatuses for such measurement, apparatuses performing measurement during transportation of articles have been known, as shown in Japanese Patent No. 3168494 and Japanese Patent Publication No. H8-18011.

In a conventional measuring apparatus such as one shown in the Japanese Patent No. 3168494, as shown in FIG. 6(a), downstream ends 81a of transporting members 81 in a feed conveyor 80 and upstream ends 91a of transporting members 91 of a measuring conveyor 90 are located at the same level, and widthwise overlap with each other. This arrangement is employed for the purpose of reducing vibrations and shocks, which may occur when a product or article M is transferred from the feed conveyor 80 to the measuring conveyor 90.

However, the transporting members 81 and 91 such as belts must be shifted widthwise from each other so that portions of the article M carried by these members change when it is transferred from the conveyor 80 to the conveyor 90. As shown in FIG. 6(b), therefore, if the article M is a carton or the like having a convex bottom surface, a change of Δ in vertical position occurs when the article M is transferred from the conveyor 80 to the conveyor 90. This may cause vibrations and instability in position of the article M. As a result, a measuring accuracy may become lower.

In particular, if the article M is a carton of milk or the like, which is heavy and vertically long, and has a small bottom surface, it is more likely that the article M becomes instable during the transfer.

A measuring apparatus disclosed in the Japanese Patent Publication No. H8-18011 does not overcome the above problem relating to the transfer.

In view of the above, it will be apparent to those skilled in the art from this disclosure that there exists a need for an improved measuring apparatus that overcomes the problem discussed above This invention addresses this need in the art as well as other needs, which will become apparent to those skilled in the art from this disclosure.

SUMMARY OF THE INVENTION

Accordingly, an object of the invention is to provide a measuring apparatus, which can stably transport an article, can suppress vibrations during transfer to and from a measuring conveyor, and thereby can improve a measuring accuracy.

For achieving the above object, a measuring apparatus according to the invention includes a measuring conveyor, a feed conveyor, a discharge conveyor, and a central conveyor. The measuring conveyor has weight detecting means and a plurality of belts. The belts are spaced apart widthwise from each other, and are born by the weight detecting means, such that a weight of an article can be measured while the article is transported on belt transporting surfaces of the belts. The feed conveyor has a plurality of first transporting members each having a first transporting surface. The discharge conveyor has a plurality of second transporting members each having a second transporting surface. The central conveyor has a third transporting member that has a third transporting surface and is arranged between the plurality of belts of the measuring conveyor. The third transporting member extends through the measuring conveyor along transporting direction. The third transporting surface of the central conveyor has level portions and a lower portion. The level portions are disposed in a first transfer area which between the feed conveyor and the measuring conveyor, and a second transfer area which is between the measuring conveyor and the discharge conveyor. The lower portion is disposed where the measuring conveyor is located. The level portions of the third transporting surface are located at substantially the same height as the belt transporting surfaces of the measuring conveyor. The measuring lower portion of the third transporting surface is located vertically below the belt transporting surfaces of the measuring conveyor.

According to the invention, the surfaces of the central conveyor in the first and second transfer areas, where the articles are transferred to and from the measuring conveyor, are located at the substantially same height. Therefore, the article can be transferred smoothly to and from the measuring conveyor. Accordingly, it is possible to suppress vibrations and therefore to perform accurate measurement.

Not only the first and second transporting members of the feed and discharge conveyors but also the belts of the measuring conveyor support the opposite side portions of the article for transportation. Thus, the article is stably supported at the same positions before, during and after the measuring so that the position of the article can be stable during the transportation. This improves the measuring accuracy.

According to the measuring apparatus of the invention, it is preferable that the belt of the measuring conveyor is formed of a flat belt, and the first, second and third transporting members are respectively formed of members thicker than the flat belt. According to this structure, the feed, discharge and central conveyors have the thick transporting members, and therefore have high durability. Meanwhile, the measuring conveyor has the thin flat belts, and therefore can achieve high running stability. Therefore, the measuring accuracy is further improved.

Preferably, the central conveyor of the invention further includes a pusher pushing downward the lower portion of the third transporting member for shifting downward the lower portion of the third transporting member of the central conveyor in the vertical position. The pusher extends above and over the third transporting member, and is fixedly attached to a frame, which is not born by the weight detector. Since the pusher pushes downward the transporting member of the central conveyor, the article can be reliably kept from contact with the transporting member of the central conveyor.

According to the measuring apparatus of the invention, it is preferable that the measuring conveyor further includes pulleys that are disposed in upstream and downstream positions in the transporting direction. The belt of the measuring conveyor is wound in an annular fashion around the pulleys. The pulley in the upstream position has a smaller diameter than the pulley in the downstream position. According to this structure, since the upstream pulley of the measuring conveyor is small, a bridge plate arranged between the upstream feed conveyor and the measuring conveyor can be small, and therefore the friction between the surface of the bridge plate and the bottom surface of the article acts only for a short length (a short time). As a result, the transporting force can be effectively transmitted, and changes in speed can be small. Accordingly, measuring errors can be suppressed.

According to the measuring apparatus of the invention, it is preferable that the pair of downstream pulleys is supported by a first axis that is extending through the downstream pulleys and a space under the third transporting member of the central conveyor. On the other hand, each of the pair of upstream pulleys is individually supported by one of a pair of second axes that is not extending through the space under the third transporting member of the central conveyor. According to this structure, since the second axes do not extend through the space under the third transporting member of the central conveyor, the second axes can be located sufficiently high so that the upstream pulleys can be sufficiently reduced in size. Therefore, the bridge plate can be small, and the measuring accuracy can be improved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the following description, a measuring apparatus is applied to an inspection line of articles such as cartons of milk.

Figure 1:
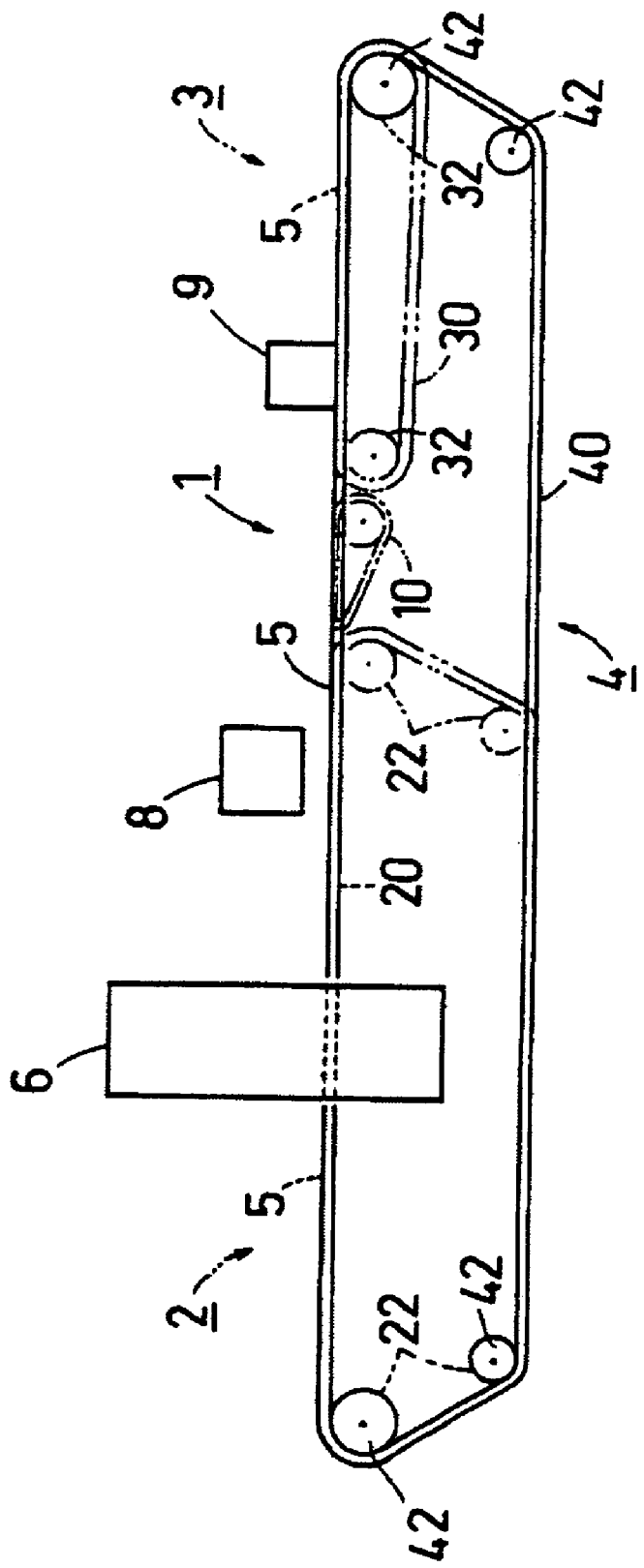
FIG. 1 is a schematic side view showing a layout of an inspection line in accordance with an embodiment of the present invention.

Entire Structure:

FIG. 1 shows a layout of an inspection line. In FIG. 1, a feed conveyor 2 is arranged upstream to a measuring conveyor 1 for feeding or carrying in an article M, and a discharge conveyor 3 is arranged downstream from the measuring conveyor 1 for transporting the article M, of which weight was measured, to a downstream line. The article M is transported on transporting surfaces 5 (an example of first, second, and third transporting surfaces) of the measuring conveyor 1, feed conveyor 2 and discharge conveyor 3. A metal inspector 6 and a print inspection camera 8 are arranged near a middle portion of the feed conveyor 2. Near a middle portion of the discharge conveyor 3 which is disposed downstream from the measuring conveyor 1, a sorting device 9 is arranged for sorting out unacceptable articles.

Figure 2:
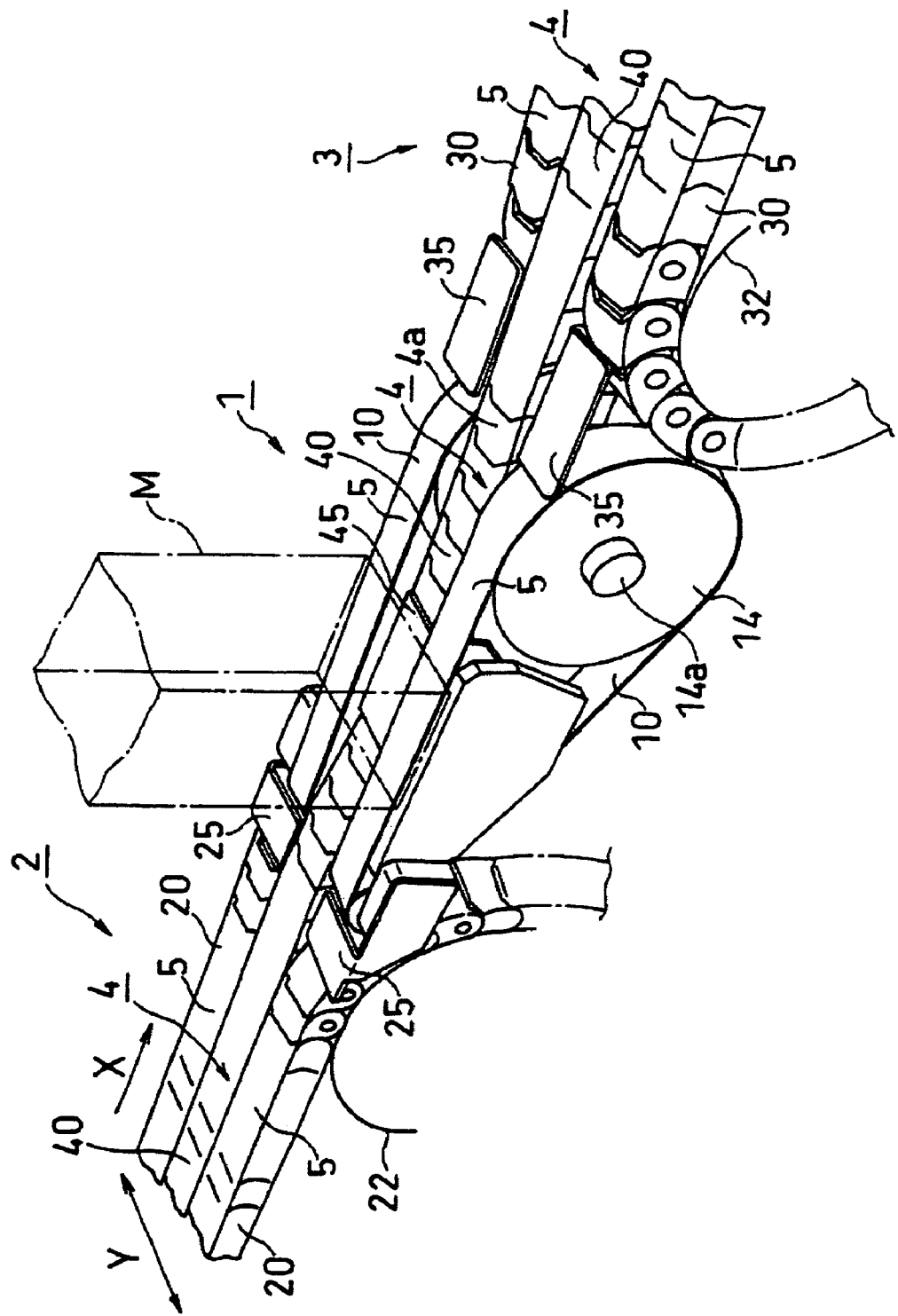
FIG. 2 is a schematic perspective view showing the measuring conveyor and the surrounding portions in accordance with the embodiment of the present invention.

As shown in FIGS. 1 and 2, the metal inspector 6 and the print inspection camera 8 inspect the article M, which is being transported on the feed conveyor 2. Then, the article M is sent onto the measuring conveyor 1, and is measured by the measuring conveyor 1 during transportation. Thereafter, the article M is sent onto the discharge conveyor 3, and is sorted out by the sorting device 9 if the article M is already determined as an unacceptable article during the inspection or measuring processing. An acceptable article is further transported downstream.

Measuring Conveyor 1

Figure 3:
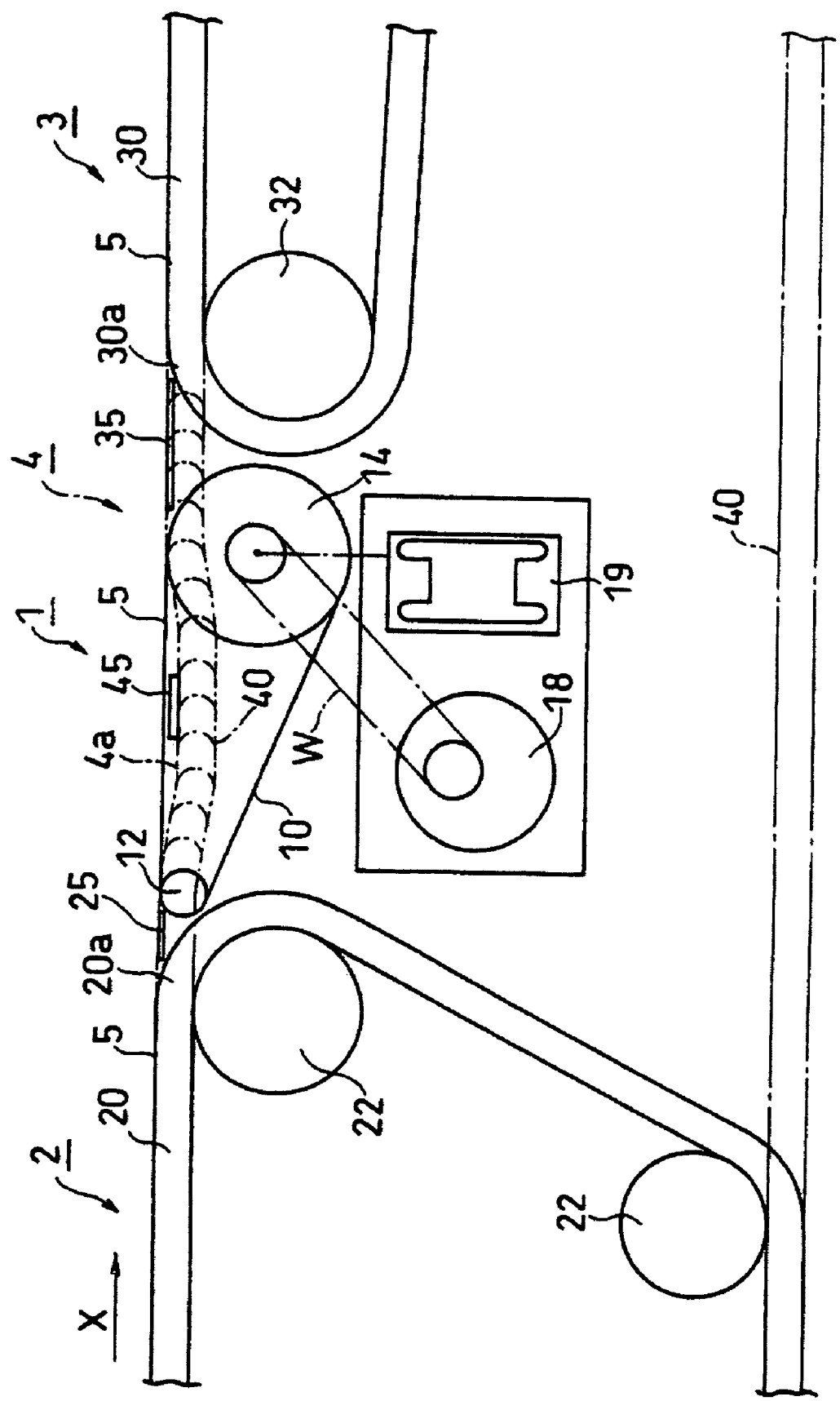
FIG. 3 is a schematic side view of the measuring conveyor and the surrounding portions in accordance with the embodiment of the present invention.

As shown in FIG. 2, the measuring conveyor 1 has a pair of belts 10 disposed in parallel and spaced from each other in a direction of width Y. As shown in FIG. 3, the belt 10 is wound in an annular fashion around a pair of pulleys 12 and 14 arranged in the upstream and downstream positions with respect to a transporting direction X, and forms a part of the transporting surface 5. As clearly shown in FIG. 4, the upstream pulley 12 has a smaller diameter than the diameter of the downstream pulley 14.

The downstream pulley 14 is connected to a drive mechanism 18 of the measuring conveyor 1 through a power transmission member W. The drive mechanism is a conventional component that is well known in the art. Accordingly, the structure of the drive mechanism 18 will not be discussed or illustrated in detail herein.

The measuring conveyor 1 is fixedly attached to an input end of a weight detector 19 through a conveyor frame (not shown), and thereby is born by the weight detector 19. Therefore, the weight detector 19 bears a weight of the article M while the article M is being transported on the measuring conveyor 1, and thereby can measure the weight of the article M during the transportation. The weight detector 19 is not limited to any particular device, and can be any conventional device that can achieve the purpose of the invention. Since weight detectors are well known in the art, their structures and functions will not be explained herein. It will be apparent to those ordinarily skilled in the art what type of weight detectors can be used and how they can be used in the structure of the present invention.

Feed Conveyor 2

As shown in FIG. 2, the feed conveyor 2 has a pair of first transporting members 20, which form a part of the transporting surfaces 5. As shown in FIG. 2, the first transporting members 20 are disposed in parallel, in a linearly extended manner with respected to the belts 10. Also as shown in FIG. 1, the first transporting members 20 are wound around a plurality of pulleys 22 in an annular fashion, such that the ends of the first transporting members 20 are space apart from ends of the belts 10 in the transporting direction. The pulleys 22 are operatively coupled to a driving mechanism (not shown in the Figures), which rotates the pulleys 22 and operates the first transfer member 20. As shown in FIG. 3, the first transporting member 20 has a downstream end 20a, which is spaced in the direction X (transporting direction) of travel from the belt 10 of the measuring conveyor 1. A first bridge plate 25 is arranged between each first transporting member 20 of the feed conveyor 2 and the corresponding belt 10 of the measuring conveyor 1. The first bridge plate 25 has a surface located at substantially the same level or height as the transporting surfaces 5 of the first transporting member 20 and the belt 10, and can carry opposite side portions of the article M, which is moving from the feed conveyor 2 onto the measuring conveyor 1.

Discharge Conveyor 3

The discharge conveyor 3 has a pair of second transporting members 30 forming a part of the transporting surface 5. As shown in FIG. 2, the second transporting members 30 are disposed in parallel, in a linearly extended manner with respected to the belts 10. As shown in FIG. 1, the second transporting member 30 is wound around a plurality of pulleys 32 in an annular fashion, such that the ends of the second transporting members 30 are spaced apart from the ends of the belts 10 in the transporting direction. The pulleys 32 are operatively coupled to a driving mechanism (not shown in the Figures), which rotates the pulleys 32 and operates the second transfer member 30. As shown in FIG. 3, the second transporting member 30 has an upstream end 30a spaced in the travel direction X (transporting direction) from the belt 10 of the measuring conveyor 1. A second bridge plate 35 is arranged between each second transporting member 30 of the discharge conveyor 3 and the corresponding belt 10 of the measuring conveyor 1. The second bridge plate 35 is located at substantially the same height as the transporting surfaces 5 of the second transporting member 30 and the belt 10, and can carry the opposite side portions of the article M, which is moving from the measuring conveyor 1 onto the discharge conveyor 3.

Central Conveyor 4

As depicted by solid line in FIG. 1, a central conveyor 4 extends throughout an inspection line. As shown in FIG. 2, the central conveyor 4 has a third transporting member 40 arranged between the paired belts 10, first transporting members 20 and transporting members 30 of the conveyors 1, 2 and 3. More specifically, the central conveyor 4 extends in the transporting direction X through the measuring conveyor 1, and continues from the feed conveyor 2 to the discharge conveyor 3 in the transporting direction X. The third transporting member 40 provides a transporting surface 4a of the central conveyor 4. As shown in FIG. 1, the third transporting member 40 is wound around a plurality of pulleys 42 in an annular fashion. The pulleys 42 are operatively coupled to a driving mechanism (not shown in the Figures), which rotates the pulleys 42 and operates the third transfer member 40.

Each belt 10 of the measuring conveyor 1 shown in FIG. 2 is a flat belt, and each of the first, second and third transporting members 20, 30 and 40 is formed of a member thicker than the belt 10. Each of the first, second and third transporting members 20, 30 and 40 may be a so-called plastic-top chain, which is formed of a plurality of plastic elements coupled together by coupling pins fitted into apertures in the plastic elements. The respective conveyors other than the measuring conveyor have the thick transporting members, and therefore have high durability. Meanwhile, the flat belt of the measuring conveyor is thin, and therefore can achieve high travelling stability so that a measuring error can be reduced.

Positional Relationship Between Transporting Members

Figure 4:
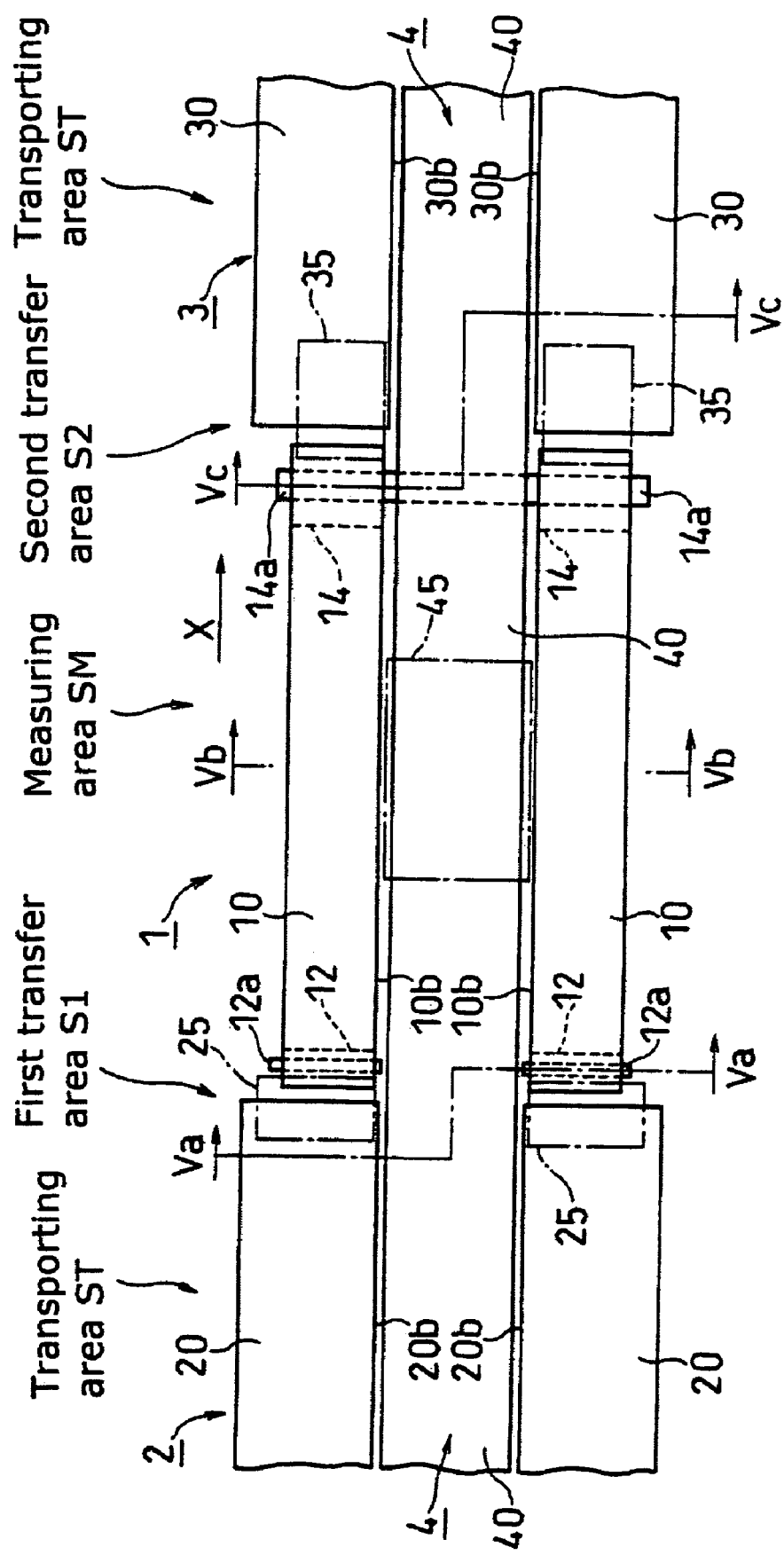
FIG. 4 is a schematic plan of the measuring conveyor and the surrounding portions in accordance with the embodiment of the present invention.

As shown in FIG. 4, the belt 10 of the measuring conveyor 1 and the first and second transporting members 20 and 30 on each side have inner sides 10b, 20b and 30b, which extend substantially on the same straight line along the transporting direction X. The third transporting member 40 of the central conveyor 4 is substantially parallel to the belt 10 and the first and second transporting members 20 and 30.

Figure 5:
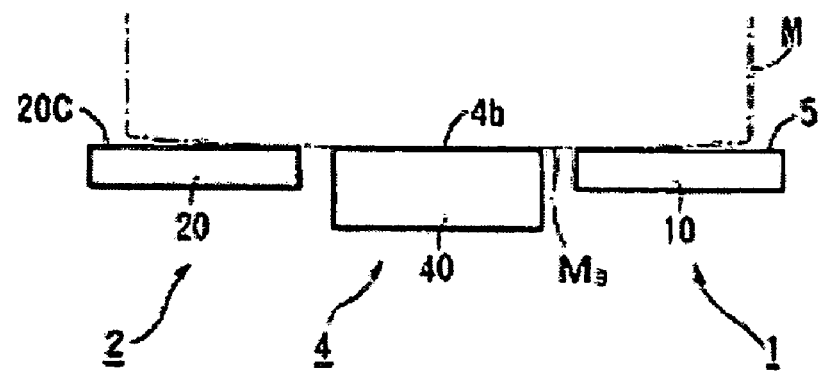
FIG. 5 show cross sectional views of the measuring conveyor respectively in accordance with he embodiment of the present invention, viewed along lines Va—Va, Vb—Vb and Vc—Vc.
Figure 5:
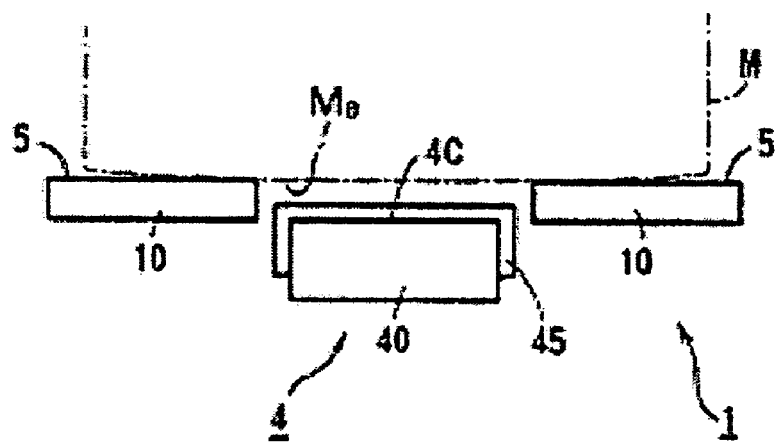
Figure 5:
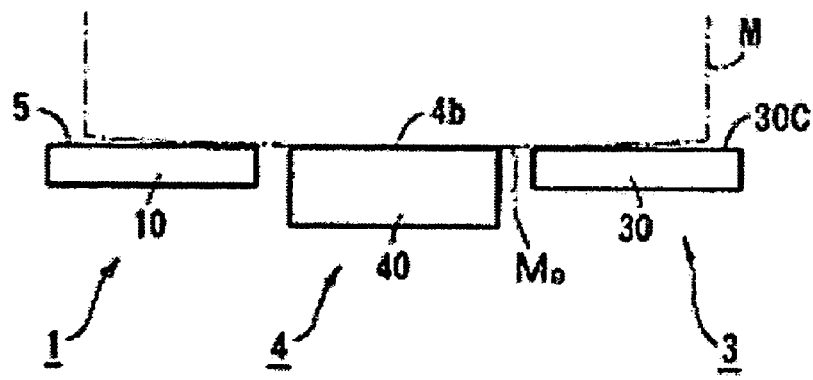
Figure 6:
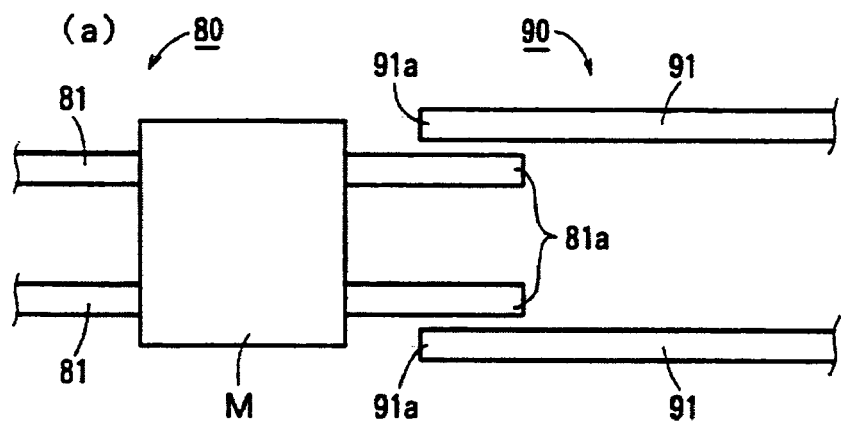
FIG. 6 are a plan and a cross sectional views of a conventional measuring apparatus.
Figure 6:
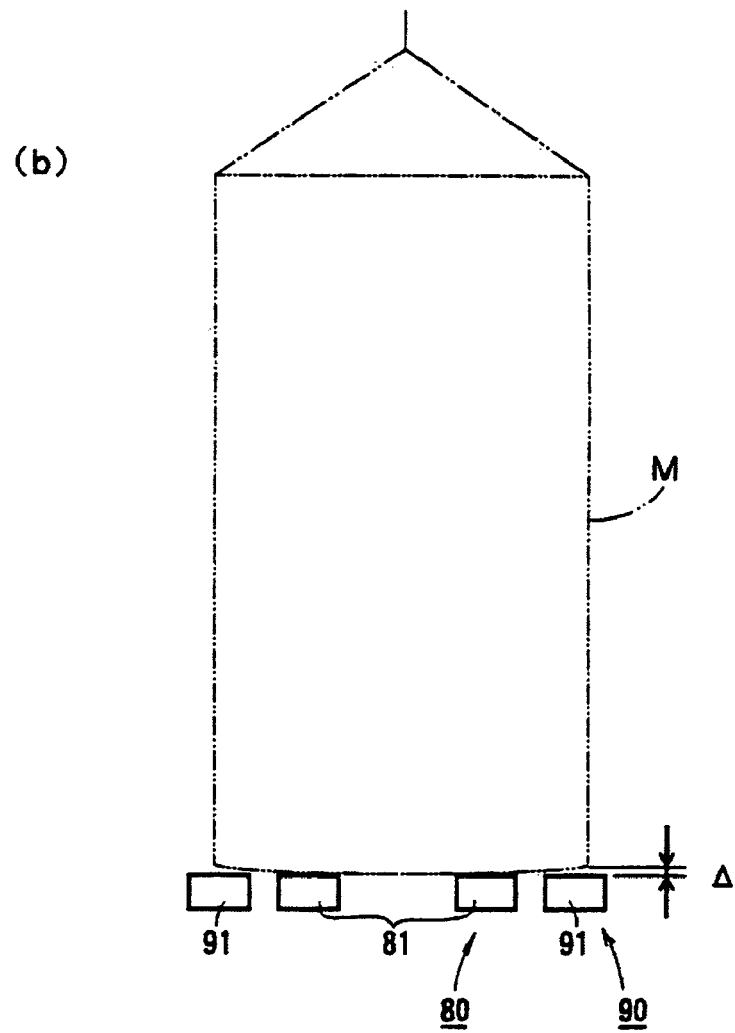

In a first transfer area S1, which is the area between the feed conveyor 2 and the measuring conveyor 1, as well as a second transfer area S2, which is the area between the measuring conveyor 1 and the discharge conveyor 3, level portions 4b of the transporting surface 4a are disposed, such that the transporting surface 4a of the third transporting member 40 of the central conveyor 4 is located substantially at the same height as the transporting surface 5 of the belt 10 of the measuring conveyor 1 as shown in FIGS. 5(a) and 5(c). Since first and second transporting surfaces 20c and 30c of the first and second transporting member 20 and 30 are disposed at the same height as the belt transporting surface 5 of the belt 10, the level portions 4b of the third transporting member 40 are also disposed at the same height as the first and second transporting surfaces 20c and 30c of the first and second transporting member 20 and 30, as shown in FIGS. 5(a) and (c).

However, in a measuring area SM, which is where the measuring conveyor 1 is located, a lower portion 4c is disposed as shown in FIG. 5(b), such that the transporting surface 4a of the central conveyor 4 is vertically shifted downward from the transporting surface 5 of the belt 10 of the measuring conveyor 1 as shown in FIG. 5(b). Thus, the bottom surface MB of the article M will be spaced from the transporting surface 4a of the central conveyor 4 while the article M is in the measuring area SM, so that the central conveyor 4 does not bear the weight of the article M, and the belts 10 carry the opposite side portions (i.e., the portions other than the central portion) of the bottom surface MB of the article M. Also, since the downward shift of the transporting surface 4a of the third transporting member 40 is gradual, the fact that the transporting surface 4a shifts away from the bottom surface MB does not cause vibrations to the article M.

The vertical position of the transporting surface 4a is determined by a pusher 45 pushing downward the third transporting member 40. The pusher 45 has substantially an inverted U-shaped section extending above and over the third transporting member 40, and is fixedly held to a frame (not shown) that is not born by the weight detector 19 (FIG. 3). In this manner, the pusher 45 keeps the physical height of the third transporting member 40 low so that the article M can be reliably kept from contact with the third transporting member 40.

In the first and second transfer areas S1 and S2 as well as other transfer areas ST except for the measuring area SM, the transporting surface 4a of the central conveyor 4 is located at substantially the same height as the transporting surfaces 5 of the first and second transporting members 20 and 30 as shown in FIGS. 5(a) and 5(c), and form the transporting surface 5 together with the first and second transporting members 20 and 30.

Transporting State

In the upstream transporting area ST, the article M is transported by the first and third transporting members 20 and 40, which carry the opposite side portions and central portion of the bottom surface MB.

Then, in the first transfer area S1, the article M is transferred onto the measuring conveyor 1 by the third transporting member 40 carrying primarily the central portion of the bottom surface MB and the first bridge plates 25 having the surfaces carrying the opposite side portions of the bottom surface MB, respectively. In this operation, since the first bridge plate 25 carries the opposite side portions of the bottom surface MB of the article M, the position of the article M does not become instable, and the article M can smoothly move from the feed conveyor 2 onto the measuring conveyor 1.

In the measuring area SM, as shown in FIGS. 2 and 3, the third transporting member 40 is spaced downward from the transporting surface 5 of the measuring conveyor 1 to gradually increase a vertical distance between them as the position moves downstream. Then, in a region downstream from the pusher 45, the third transporting member 40 substantially changes its direction to extend slightly upward, and reaches substantially the same height as the measuring conveyor 1 before the second transfer area S2. In the measuring area SM, therefore, the central portion of the bottom surface MB of the article M is spaced from the transporting surface 4a of the central conveyor 4 as shown in FIG. 5(b), and the article M is transported by the belts 10, which only carry the opposite side portions of the bottom surface MB, respectively. While the belts 10 are transporting the article M on the measuring conveyor 1, the weight detector 19 (FIG. 3) measures the weight of the article M. Since the transporting surface of the third transporting member 40 shifts downward gradually, and the third transport member 40 gradually retreats from support of the bottom surface MB. Accordingly, the article M can be stably supported by the belts 10 without undesirable vibrations while the article M is transported through the measuring area SM.

Then, the article M moves through the second transfer area S2, during which the third transporting member 40 primarily carries the central portion of the bottom surface MB, and the surfaces of the second bridge plates 35 carry the opposite side portions of the bottom surface MB. Thereby, the article M moves onto the discharge conveyor 3. In this operation, since the second bridge plates 35 carry the opposite side portions of the bottom surface MB of the article M during the transportation respectively, the article M can smoothly move from the measuring conveyor 1 onto the discharge conveyor 3, as in the case where the article M is transported through the first transfer area S1.

Thereafter, as shown in FIG. 5(c), the article M is transported through the downstream transporting area ST, during which the second and third transporting members 30 and 40 carry the opposite side portions and central portion of the bottom surface MB.

As shown in FIG. 4, the pair of downstream pulleys 14, around which the belts 10 of the measuring conveyor 1 are wound, are supported by a first axis 14a, which extends through the pulleys 14 and a space under the third transporting members 40 of the central conveyor 4. Meanwhile, each of the pair of upstream pulleys 12 is individually supported by corresponding one of a pair of second axes 12a, which do not extend through the space under the third transporting member 40 of the central conveyor 4. Since the second axes 12a do not extend through the space under the third transporting member 40, the center of the second axis 12a can be positioned sufficiently high. Therefore, the upstream pulleys 12 can have sufficiently small sizes so that a space between the feed conveyor 2 and the measuring conveyor 1 is small. Accordingly, the first bridge plate 25 can be sufficiently short, which suppresses reduction in transporting speed of the article M, and thus reduces the measuring error.

In the embodiment described above, all the parts forming the plastic-top chains, which form the first, second and third transporting members 20, 30 and 40, are made of resin. Since the transporting members 20, 30 and 40 are formed of the members not including a metal part, detection error is suppressed in the operation of the metal inspector 6 as shown in FIG. 1.

Further, the one annular central conveyor 4 transports the article M so that shaking of the article M is suppressed in each transfer area between the conveyors. Therefore, the measuring apparatus can stably perform the metal detection, printing, print inspection and measurement. Since the distance between the neighboring inspection stages can be short, the measuring apparatus can have a short whole length. Also since drive portions of the conveyors can be reduced, the structure can be simple and inexpensive. Further, it is possible to reduce the occurrences of malfunctioning, such as various parts being worn out or braking down.

The preferable embodiment has been described above with reference to the drawings. However, various modifications and variations can be effected without departing from the spirit and scope of the invention.

For example, it is not essential that the central conveyor extends throughout the inspection line. More specifically, the central conveyor does not have to extend through the ends of the discharge conveyor and the feed conveyor as in the above-described embodiment. Instead, the central conveyor only needs to extend beyond the border between the measuring conveyor and the feeding conveyor, and the border between the measuring conveyor and the discharge conveyor.

Instead of the bridge plates, bridge members formed of, e.g., a plurality of free rollers may be employed. In that case, in lieu of the bridge members, free rollers that are supported on axes that are fixedly held to the frame are disposed between the feed conveyor and the measuring conveyor, and between the conveyor and the discharge conveyor.

Although the feeding conveyor 2, the discharging conveyor 3, and the measuring conveyor 1 respectively have two of the first transporting members, second transporting members and belts, the feeding conveyor 2, the discharging conveyor 3, and the measuring conveyor 1 may have three or more of the transporting members or belts. Also, the central conveyor 4 may employ two or more of the third transporting members 40. In this case, the bridge plate may not be necessary.

For shifting the central conveyor to the lower position in the measuring area, various manners other than the use of the pushers may be employed. For example, suction, blowing or the like by a pneumatic pressure may be used. Alternatively, or in conjunction with other manners, a magnetic force may also be used. It will be clear to an ordinarily skilled in the art without further explanation how the central conveyor can be shifted to the lower position by using a pneumatic pressure or a magnetic force.

The article to be transported is not restricted to a carton of liquid.

Although the transporting surface 4a is positioned at substantially the same height as the transporting surface of the first and second transporting members 20 and 30 in the previous embodiment, the transporting surface 4a of the central conveyor 4 may be configured to be located in a slightly lower position than the transporting surfaces 5 of the first and second transporting members 20 and 30.

Accordingly, it is clearly understood that the foregoing modifications and corrections fall within a scope of the present invention limited only by the terms of the appended claims.

According to the invention, as described above, the measuring, feed and discharge conveyors transport the article while carrying the opposite sides of the article. Accordingly, the conveyors can stably transport the article.

Further, in each transfer portion between the measuring conveyor and the upstream or downstream conveyor, the annular transporting member of the central conveyor transports the article so that vibrations of the article are suppressed. Accordingly, accurate measurement of the article can be performed.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The drive mechanism is a conventional component that is well known in the art. Accordingly, its structure will not be discussed or illustrated in detail herein.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-058085. The entire disclosure of Japanese Patent Application No. 2003-058085 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A measuring apparatus for measuring an article while transporting the article, comprising:
    a measuring conveyor having weight detecting means and a plurality of belts spaced apart widthwise from each other, said belts being born by said weight detecting means, said measuring conveyor transporting an article on belt transporting surfaces of said belts and measuring a weight of the article during the transportation;
    a feed conveyor having a plurality of first transporting members each having a first transporting surface;
    a discharge conveyor having a plurality of second transporting members each having a second transporting surface; and
    a central conveyor having a third transporting member that has a third transporting surface and is arranged between said plurality of belts of said measuring conveyor, said third transporting member extending through said measuring conveyor along a transporting direction, wherein
    said third transporting surface of said central conveyor has level portions and a lower portion, said level portions being disposed in a first transfer area between said feed conveyor and said measuring conveyor, and a second transfer area between said measuring conveyor and said discharge conveyor, said lower portion being disposed where said measuring conveyor is located, said level portions of said third transporting surface being located at substantially the same height as the belt transporting surfaces of said measuring conveyor, said lower portion being located vertically below the belt transporting surfaces of said measuring conveyor.

2. The measuring apparatus according to claim 1, wherein
    at least one of the belts of said measuring conveyor is formed of a flat belt, and
    each of said first, second and third transporting members is thicker than said flat belt.

3. The measuring apparatus according to claim 1, wherein:
    said central conveyor further includes a pusher pushing downward said third transporting member in said lower portion such that said lower portion of said third transporting member of said central conveyor is vertically shifted downward from the belt transporting surfaces of said belt.

4. The measuring apparatus according to claim 1, wherein
    said measuring conveyor further includes pulleys that are disposed on upstream and downstream positions in the transporting direction,
    said belt of said measuring conveyor is an annular member wound around said pulleys, and
    a diameter of said upstream pulley is smaller than a diameter of said downstream pulley.

5. The measuring apparatus according to claim 4, wherein
    said downstream pulleys are supported by a first axis, said first axis extending through said downstream pulleys and a space under said third transporting member of said central conveyor, and
    each of said pair of upstream pulleys is individually supported by one of a pair of second axes, said second axes not extending through the space under said transporting member of said central conveyor.

6. The measuring apparatus according to claim 1, wherein
    said plurality of first transporting members is spaced apart in the travelling direction from said plurality of belts, and
    said plurality of second transporting members is spaced apart in the travelling direction from said plurality of belts.

7. The measuring apparatus according to claim 6, further comprising
    first bridge plates arranged between said first transporting members and said belts, said first bridge plates being arranged at substantially the same level as said belts; and
    second bridge plates arranged between said second transporting members and said belts, said second bridge plates being arranged at substantially the same level as said belts.

8. The measuring apparatus according to claim 1, wherein
    said first transporting surfaces, said belt transporting surfaces, and said second transporting surfaces are arranged at substantially the same level.

9. The measuring apparatus according to claim 1, wherein
    said first transporting members, said belts, and said second transporting members are disposed in a linearly extended manner with respect to one another.

* * * * *